US010999889B2

(12) United States Patent
Maginity et al.

(10) Patent No.: US 10,999,889 B2
(45) Date of Patent: May 4, 2021

(54) SYSTEM, INSTRUMENT, AND METHOD FOR MONITORING A PREMISES

(71) Applicant: VIAVI SOLUTIONS INC., San Jose, CA (US)

(72) Inventors: Michael Andrew Maginity, Greencastle, IN (US); Adam Dane Jones, Daleville, IN (US); Allen Joseph Studer, Indianapolis, IN (US)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 16/722,148

(22) Filed: Dec. 20, 2019

(65) Prior Publication Data

US 2020/0205223 A1 Jun. 25, 2020

Related U.S. Application Data

(60) Provisional application No. 62/783,592, filed on Dec. 21, 2018.

(51) Int. Cl.
| | |
|---|---|
| *H04W 4/90* | (2018.01) |
| *H04W 76/50* | (2018.01) |
| *G08B 25/14* | (2006.01) |
| *G07C 9/00* | (2020.01) |
| *G08B 25/10* | (2006.01) |
| *G08B 25/00* | (2006.01) |

(52) U.S. Cl.
CPC ........ *H04W 76/50* (2018.02); *G07C 9/00309* (2013.01); *G08B 25/001* (2013.01); *G08B 25/10* (2013.01); *G08B 25/14* (2013.01); *H04W 4/90* (2018.02); *G07C 2009/00523* (2013.01)

(58) Field of Classification Search
CPC ... H04W 4/90; G07C 9/00309; G08B 25/001; G08B 25/14
See application file for complete search history.

(56) References Cited

U.S. PATENT DOCUMENTS

| | | | | |
|---|---|---|---|---|
| 6,959,013 | B1 * | 10/2005 | Muller | H04W 88/022 370/512 |
| 7,174,005 | B1 * | 2/2007 | Rodkey | H04L 12/1895 379/252 |
| 2006/0129309 | A1 * | 6/2006 | Alewine | G01C 21/26 701/34.4 |
| 2014/0120863 | A1 * | 5/2014 | Ferguson | H04M 1/72541 455/404.2 |
| 2017/0124835 | A1 * | 5/2017 | Boyina | G08B 21/0461 |
| 2018/0322405 | A1 * | 11/2018 | Fadell | G06N 5/04 |
| 2019/0156191 | A1 * | 5/2019 | Cordes | G06N 3/006 |
| 2019/0215675 | A1 * | 7/2019 | Lesage | G08B 25/006 |
| 2019/0339804 | A1 * | 11/2019 | Gleeson | G06F 3/03547 |
| 2020/0252268 | A1 * | 8/2020 | Chen | H04L 41/0893 |

* cited by examiner

*Primary Examiner* — Dai Phuong
(74) *Attorney, Agent, or Firm* — DLA Piper LLP (US)

(57) ABSTRACT

Systems, instruments, and methods for monitoring a premises, including, for example, a school, home, or other building.

20 Claims, 3 Drawing Sheets

SYSTEM, INSTRUMENT, AND METHOD FOR MONITORING A PREMISES

CROSS REFERENCE TO RELATED APPLICATION

This application claims priority to U.S. Provisional Application No. 62/783,592 filed Dec. 21, 2018, which is hereby incorporated by reference in its entirety.

TECHNICAL FIELD

The present disclosure relates generally to monitoring systems and methods and, more specifically, to system and methods for monitoring a premises for emergency events to facilitate responses to those events.

BACKGROUND

Systems for monitoring premises including schools, homes, government facilities, hospitals, and other buildings are well-known. Such systems may include sensors to detect activity at each premises and/or local user input devices such as keypads, screens, and other interface devices that permit a local user (e.g., teacher, student, patient, or resident) to report activity at the premises. The monitoring systems may also include controllers to communicate that activity to a central monitoring station or directly to law enforcement or other emergency services.

SUMMARY

A system for monitoring a premises, including, for example, a school, home, or other building is disclosed. The system may facilitate responses to events by providing notifications to law enforcement, staff, students, residents, or patients based on the nature and type of event. In some embodiments, the system may be configured to interface with existing alarm or other security systems. Instruments and methods for monitoring a premises are also disclosed.

BRIEF DESCRIPTION OF THE DRAWINGS

The detailed description particularly refers to the following figures, in which.

DETAILED DESCRIPTION OF THE DRAWINGS

Figure 1:
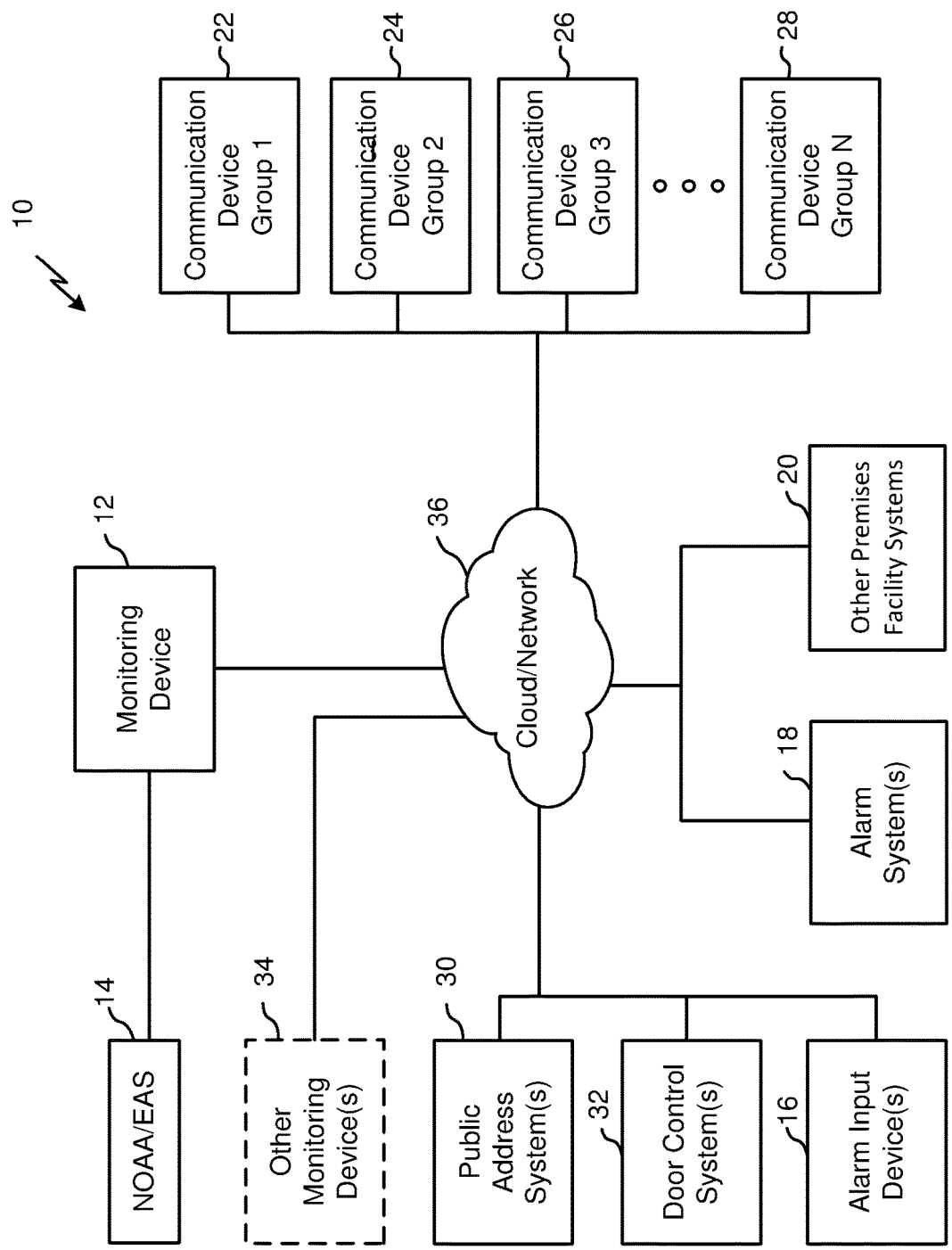
FIG. 1 is a simplified block diagram of a system for monitoring a premises in accordance with an embodiment of the disclosed principles.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring now to FIG. 1, a monitoring system 10, in accordance with an embodiment of the disclosed principles, for monitoring a premises is shown. The monitoring system 10 is illustratively an emergency system for a school. The system 10 may include a monitoring device 12 that is configured to receive event activations from multiple sources, including from National Oceanic and Atmospheric Administration (NOAA) or the Emergency Alert System (EAS) 14, one or more alarm input devices 16, one or more alarm systems 18, and other premises facility systems 20. Such event activations may result from various emergencies at the school, which may require a law enforcement or medical response.

The monitoring device 12 may be configured to send notifications in multiple formats to multiple device groups 22, 24, 26, 28, which are associated with different individuals, recipients and or organizations such as law enforcement or other first responders, students, teachers, and parents. The monitoring device 12 may also be configured to activate one or more public address systems 30, including, for example, loud speakers and Closed Circuit Television (CCTV) systems. The monitoring device may also interface with the input devices 16, one or more door control systems 32, and or other security and alarm systems. The monitoring device 12 may also be configured to communicate with other monitoring devices 34, which are associated with other schools or other premises. As shown in FIG. 1, the monitoring device 12 may be configured to communicate with the other devices via the cloud (e.g., via the Internet), local area network, or other communication network 36.

In the illustrative embodiment, the monitoring device 12 is configured to transmit preconfigured messages to device groups 22, 24, 26, 28 based on the nature and type of event as discussed below in more detail. The devices included in each group may be cell phones, smart phones, computers, and other communication devices associated with the individuals/recipients in each group. A web server (not shown) may be provided to manage and monitor the system 10. For example, users may configure, activate, and/or cancel emergency messages from a standard Web browser. Each message may be configured with audio files, text descriptions and instructions, images, outgoing notifications, and equipment activations, as described in greater detail below.

Figure 2:
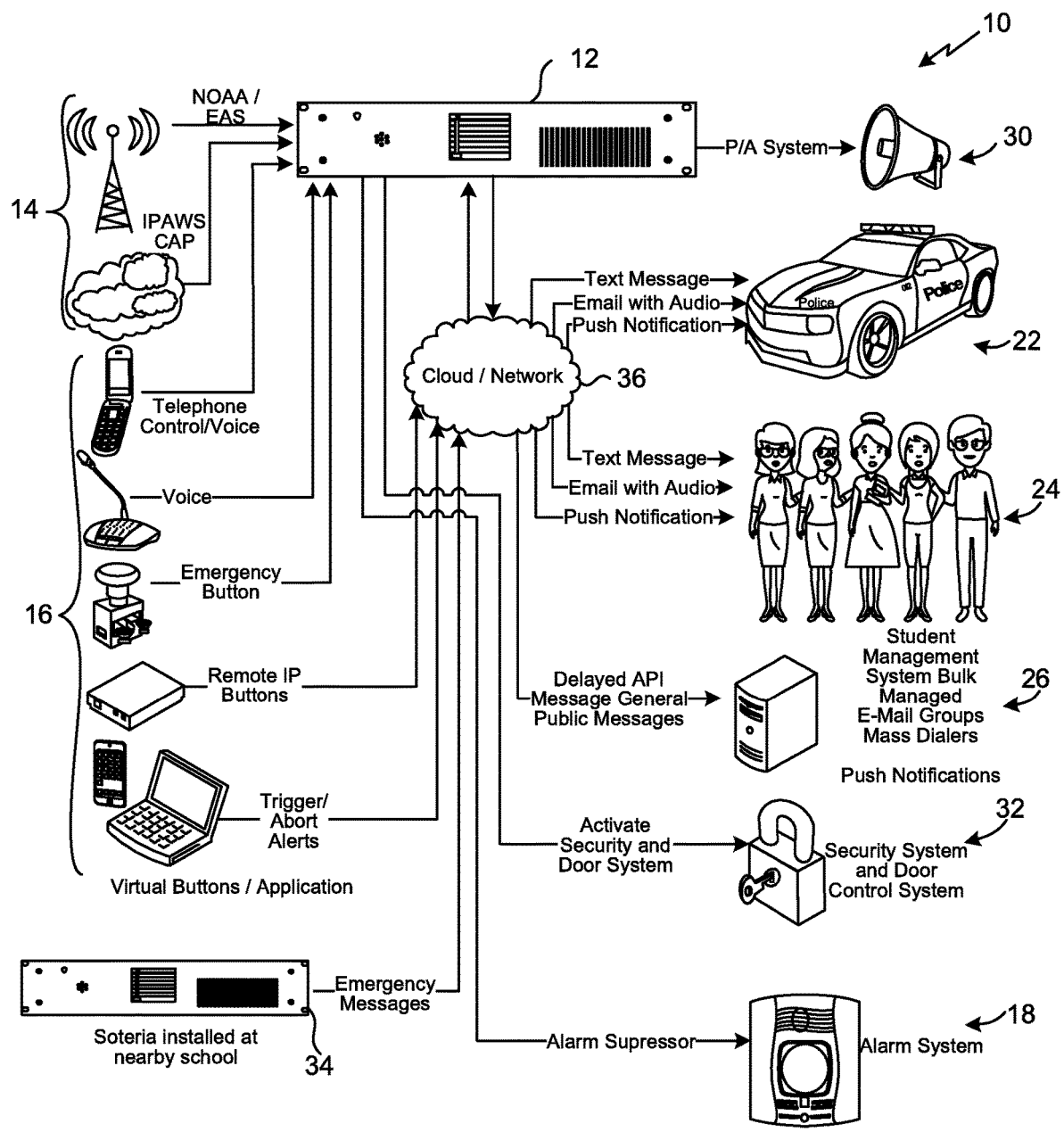
FIG. 2 is another simplified digram of the system of FIG. 1.

Referring now to FIG. 2, the system 10 may activate preconfigured messages automatically in response to inputs from a variety of input sources such as alarm input devices 16. For example, buttons, telephone codes, and other inputs may be used to operate the monitoring device 12 to transmit the messages. Buttons may be connected to onboard inputs of the monitoring device 12, and remote switches may be monitored through the connection to network 36. Computers and smart devices may activate messages using an application or Web browser. A (POTS) telephone interface may be provided to allow activation and live voice announcements from a telephone.

In the illustrative embodiment, the monitoring device 12 is configured to disable alarm systems 18 and trigger security systems such as, for example, one or more door control systems 32 and other premises facility systems 20 such as, for example, computer displays and lighting controls during specific emergencies.

The device 12 may be connected to EAS, Common Alerting Protocol (CAP), and National Weather Service sources 14 and configured to monitor for weather and local emergencies. As described above, the monitoring device 12 may also be connected to other monitoring devices 24 associated with other schools. When connected, the monitoring device 12 is configured to receive alerts from the other schools, allowing an occurrence in one school to automatically activate an event condition at other schools in the vicinity.

During an event, the device 12 may be configured to produce content and provide controls necessary to warn students, faculty, parents, law enforcement, and other first responders of the event and its nature. The device 12 is configured to operate the public address systems 30 to provide audio and/or video content via loud speakers and CCTV systems. As described in greater detail below, emails, text messages, and network notifications are delivered to multiple recipient lists, and the device 12 is configured to interface with student management systems, such as PowerSchool and Skyward®, to send emergency information and instructions to parents and other contacts outside of the school campus.

In the illustrative embodiment, the device 12 is configured to transmit preconfigured messages (e.g., audio, video, and/or text) to communication device groups 22, 24, 26, 28 associated with different groups of recipients. The messages sent to each group are preconfigured based on the individuals/recipients in the groups so that each group may receive specific information about the event, and each group may receive notifications at different times from the other groups. In the illustrative embodiment, group 22 may include communication devices associated with law enforcement and other first responders, including security officers, law enforcement officials, and administrators. Group 24 may include communication devices associated with students, faculty, and other individuals/recipients on the school campus. Group 26 illustratively includes communication devices associated with parents and the student's emergency contacts. Additional groups, up to group 28, of communication devices may include devices associated with other members of the public, including media sources.

The messages may be configured using the following exemplary options:
1) Activation Triggers
   a. General purpose inputs—Select the inputs that will be used to trigger this message. Onboard inputs and remote inputs monitored from a network interface are available
   b. Telephone code—Select the DTMF code that will trigger this message from a telephone
2) Group 22 Options:
   a. Audio message
   b. Text description
   c. Recipient list
3) Group 24 Options:
   a. Audio message
   b. Text description and instructions
   c. Recipient list
   d. Notification delay—The amount of time to wait between activating the event and sending notifications to the communication devices of group 24
4) Group 26 Through Group 28 Options:
   a. Audio message
   b. Text description and instructions
   c. Student Management System Information
   d. Notification delay—The amount of time to wait between activating the event and sending notifications to parents/public
5) Message Confirmation Options
   a. Delay Time—The amount of time to wait for a confirmation or cancellation
   b. Timeout Action—Determine what to do with the event if it is not confirmed or cancelled before the delay time expires. It can be set to either automatically activate or cancel the event
6) Alarm System(s) 18—Enable/Disable the alarm during this event
7) Security/Door Control System(s) 32—Activate/Deactivate the security or door system during this event
8) Door Control System—Lock or Unlock doors during this event
9) General Purpose Outputs—Local onboard outputs and remote outputs controlled over a network can be used to activate external equipment and systems (switches, distribution equipment, audio/video equipment, etc.)
10) Serial Notifications—Notifications/protocols delivered over a serial interface can be used to control external equipment and systems (switches, distribution equipment, audio/video equipment, sign boards, etc.)
11) IP Network Notifications—Notifications/protocols delivered over an IP network can be used to control external equipment and systems (switches, distribution equipment, audio/video equipment, middleware, management and monitoring systems, etc.)

When an event occurs, the device 12 may receive inputs from the alarm input device 16, alarm systems 18, and/or other premises facility systems 20. The device 12 may then perform a predetermined sequence of actions. For example, the device 12 may transmit preconfigured messages to group 22, including, for example, emails, texts, and network/push notifications. Each message may include a text description of the event and an audio message that has been customized for the members of group 22.

The device 12 may be configured to wait a predetermined amount of time before and or after performing the predetermined sequence of actions. If the time to wait expires, the event may be automatically cancelled or confirmed per the configured message Confirmation Timeout Action. If the message is cancelled, the device 12 may be configured to send cancellation messages via emails, text message, and network/push notifications to the group 22 recipients and then discard the message. If the message is confirmed or not canceled, then the device 12 may continue processing the event.

The device 12 may then activate the event. For example, the device 12 may activate the public address systems 30 to produce preconfigured audio, video, and/or text content. For example, the device 12 may play a preconfigured audio message or permit live voice from a telephone/microphone. The device 12 may play video produced from the preconfigured images and text. The device 12 may be configured to repeat the audio/video playback per the pre-set configuration associated with this type of event until a cancellation is received.

The device 12 may transmit preconfigured messages to group 24, including, for example, emails, texts, and network/push notifications. Each message may include a text description of the event and an audio message that has been customized for the members of group 24.

The device 12 may also operate the security/door control systems 32 per the pre-set configuration associated with this type of event, operate the alarm systems 18 per the pre-set configuration associated with this type of event, and activate configured external equipment and systems (switches, distribution equipment, audio/video equipment, sign boards, sirens, middleware, monitoring systems, etc.) per the pre-set configuration associated with this type of event. The device 12 may also add the emergency event information to the RSS feed and Web server.

The device 12 may be configured to wait a predetermined amount of time following the activation of the event. If the message is cancelled within the predetermined amount of time, the device 12 may be configured to send cancellation messages via emails, text message, and network/push notifications to the group 22 and group 24 recipients. If the message is not canceled, then the device 12 may continue processing the event and may transmit preconfigured messages to the group 26 through group 28.

The preconfigured messages to group 26 may include, for example, emails, texts, and network/push notifications. Each message to group 26 may include a text description of the event and an audio message that has been customized for the members of group 26. Similarly, each message to group 28 may include a text description of the event and an audio message that has been customized for the members of group 28.

The device 12 may then wait for a cancellation message or for other inputs from the input devices 16 or communication device groups. When a cancellation message is received, the device 12 may return the alarm, security, and door control systems to their normal state, deactivate switch, distribution, and audio/video equipment, stop audio and video playback, and deliver cancellation messages to all communication device groups that received the notifications.

Figure 3:
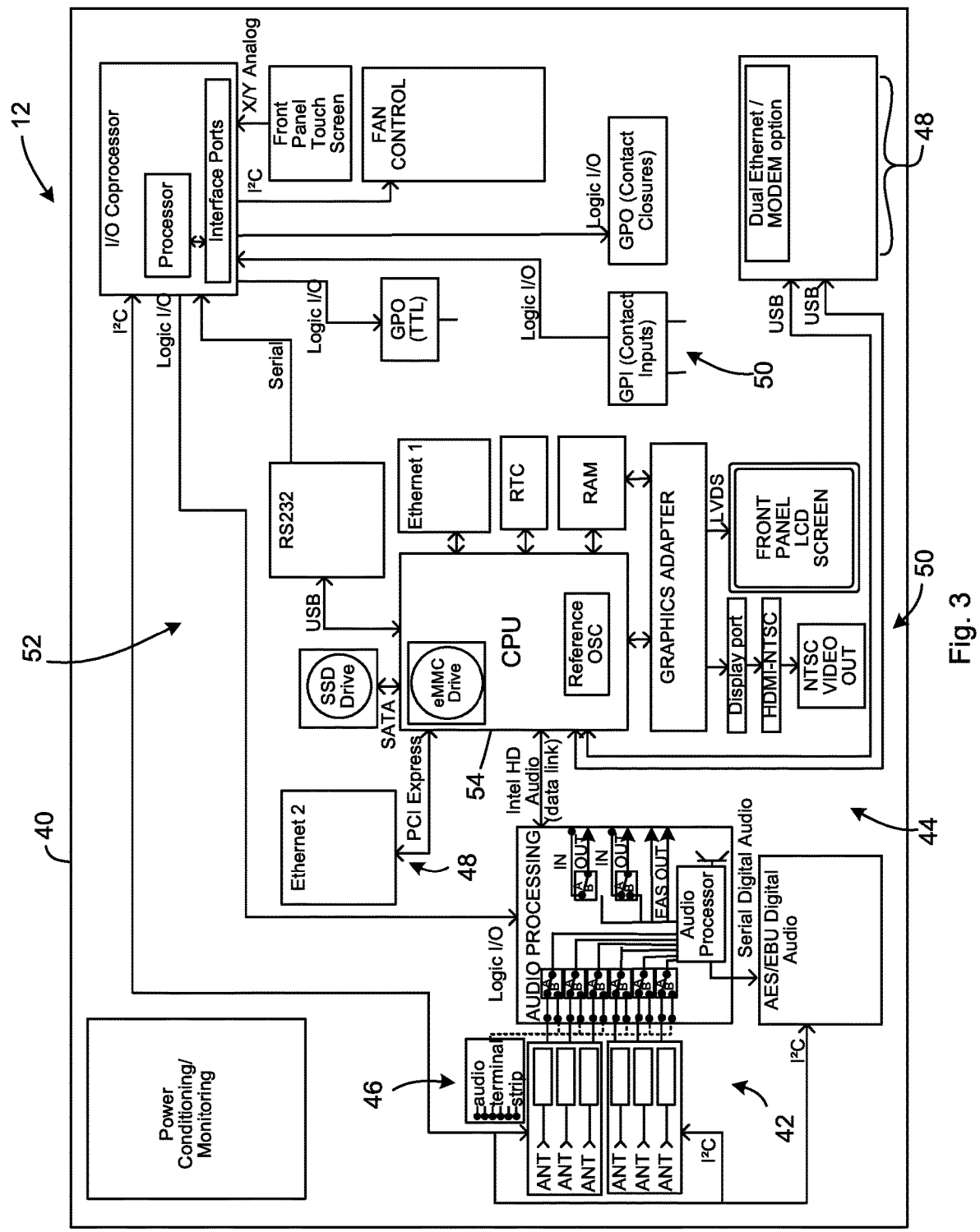
FIG. 3 is a simplified block diagram of a monitoring device in accordance with an embodiment of the disclosed principles that may be used in the system of FIGS. 1-2.

Referring now to FIG. 3, one embodiment of a monitoring device 12 is shown. The monitoring device 12 includes an outer housing 40, a communication interface 42 coupled to the housing 40, and a plurality of electrical components 44 located within the housing 30. The communication interface 42 may include numerous ports, including antenna connectors 46, Ethernet ports 48, and other ports 50 (e.g., general purpose input (GPI), general purpose output (GPO), NTSC video, RS-232) to permit the monitoring device 12 to be electrically connected to other components of the system 10.

The electrical components 44 may include an electronic controller 52 that includes a central processing unit (CPU) 54. The CPU 54 includes a processor such as, for example, a microprocessor, and memory electrically connected to the processor. Other memory (e.g., RAM, SSD drive) may also be included.

The memory is configured to store a plurality of instructions, which, when executed by the processor, cause the CPU 54 (e.g., the processor) to receive an alarm signal indicative of an event at a premises via the communication interface 42. As described above, the alarm signal may be generated by alarm input devices 16, the alarm system 18, other monitoring devices 34, and/or other premises facility systems 20. The CPU 54 may then transmit, via the communication interface 42, a first message to the group 22 communication devices in response to receiving the alarm signal and determine whether to transmit, via the communication interface 42, a second message to the group 24 communication devices after a predetermined period of time following the transmission of the first message has elapsed.

The CPU 54 may also determine whether to transmit, via the communication interface 42, a third message to the group 26 and/or the group 28 communication devices after the predetermined period of time has elapsed. As described above, the groups 22, 24, 26, 28 are associated with different groups of individuals/recipients, and each of the first message, second message, and third message is customized based on the group of individuals/recipients associated with each of the groups.

The first message may include a first description of the event that includes at least one of text and audio, and the first description may be customized based on the group of individuals/recipients associated with the group 22 communication devices. Additionally, the second message may include a second description of the emergency event different from the first message, and the second description may include at least one of text and audio and may be customized based on the group of individuals/recipients associated with the group 24 communication devices. The third message may include a third description of the event different from the first message. The third description may include at least one of text and audio and may be customized based on the group of individuals/recipients associated with the group 26 and/or group 28 communication devices.

The CPU 54 may also receive a cancellation signal via the communication interface 42, and send, via the communication interface 42, a fourth message to the groups 22, 24, 26, 28 of communication devices in response to receiving the cancellation signal.

In determining whether to send the second message to group 24, the CPU 54 may determine whether the predetermined period of time has elapsed when the cancellation signal is received, and may transmit, via the communication interface 42, the second message to the second group of communication devices when the cancellation signal is received after the predetermined period of time has elapsed, and also transmit, via the third communication interface 42, the third message to the group of communication devices when the cancellation signal is received after the predetermined period of time has elapsed.

As described above, the CPU 54 may transmit, via the communication interface 42, a control signal to operate the door control system 32 at the premises after the predetermined period of time has elapsed. The CPU 54 may transmit, via the communication interface 42, a control signal to operate the public address system 30 to produce a customized audible message at the premises.

The CPU 54 may also be configured to receive a fourth message from one of the first group of communication devices, and transmit, via the communication interface 42, a fifth message to the second group and the third group of communication devices in response to receiving the fourth message.

The CPU 54 may be configured to receive a plurality of input signals from the user interface, and customize each of the first message, the second message, and the third message based on the plurality of input signals received from the user interface.

It should be appreciated that, although system 10 is shown in connection with a school, similar systems may be used to monitor and facilitate responses to emergency situations at hospitals, offices, government buildings, and homes.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A system device for monitoring a premises, the system device comprising:
a housing,
a communication interface within the housing, the communication interface comprising at least one of an input/output port or a connection for an antenna, and
an electronic controller positioned in the housing, the electronic controller including a processor and a memory electrically connected to the processor, wherein a plurality of instructions are stored on the memory, which, when executed by the processor, cause the processor to:
receive an alarm signal indicative of an emergency event at the premises via the communication interface,
transmit, via the communication interface, a first message to a first group of communication devices in response to receiving the alarm signal,
determine whether the first message has not been canceled after a predetermined period of time following the transmission of the first message has elapsed, and transmit, via the communication interface, a second message to a second group of communication devices different from the first group based on the first message not being canceled, and
determine whether to transmit, via the communication interface, a third message to a third group of communication devices different from the first group and the second group after the predetermined period of time has elapsed,
wherein the first group, the second group, and the third group of communication devices are associated with different groups of recipients, and
wherein each of the first message, the second message, and the third message is customized based on the group of recipients associated with each of the first group, the second group, and the third group of communication devices.

2. The system device of claim 1, wherein the plurality of instructions stored on the processor further include instructions, which, when executed by the processor, cause the processor to:
receive a cancellation signal via the communication interface, and
send, via the communication interface, a fourth message to the first group, the second group, and the third group of communication devices in response to receiving the cancellation signal.

3. The system device of claim 1, wherein:
the plurality of instructions stored on the processor further include instructions, which, when executed by the processor, cause the processor to receive a cancellation signal via the communication interface, and
wherein to determine whether to transmit, via the communication interface, the second message to the second group of communication devices different from the first group after the predetermined period of time following the transmission of the first message has elapsed further includes to:

determine whether the predetermined period of time has elapsed when the cancellation signal is received, and
transmit, via the communication interface, the second message to the second group of communication devices when the cancellation signal is received after the predetermined period of time has elapsed.

4. The system device of claim 3, wherein the plurality of instructions stored on the processor further include instructions, which, when executed by the processor, cause the processor to transmit, via the communication interface, a fourth message to the first group of communication devices when the cancellation signal is received before the predetermined period of time has elapsed.

5. The system device of claim 1, wherein the plurality of instructions stored on the processor further include instructions, which, when executed by the processor, cause the processor to transmit, via the communication interface, a control signal to operate a door control system operable to selectively lock at least one door at the premises after the predetermined period of time has elapsed.

6. The system device of claim 1, wherein the plurality of instructions stored on the processor further include instructions, which, when executed by the processor, cause the processor to transmit, via the communication interface, a control signal to operate a public address system to produce a customized audible message at the premises.

7. The system device of claim 1, wherein the first message includes a first description of the emergency event that includes at least one of text and audio, the first description being customized based on the group of recipients associated with the first group of communication devices.

8. The system device of claim 7, wherein the second message includes a second description of the emergency event different from the first message, the second description including at least one of text and audio and being customized based on the group of recipients associated with the second group of communication devices.

9. The system device of claim 8, wherein the third message includes a third description of the emergency event different from the first message, the third description including at least one of text and audio and being customized based on the group of recipients associated with the third group of communication devices.

10. The system device of claim 1, wherein the plurality of instructions stored on the processor further include instructions, which, when executed by the processor, cause the processor to:
receive a fourth message from one of the first group of communication devices,
transmit, via the communication interface, a fifth message to the second group and the third group of communication devices in response to receiving the fourth message.

11. The system device of claim 1, further comprising a user interface electrically coupled to the electronic controller, wherein the plurality of instructions stored on the processor further include instructions, which, when executed by the processor, cause the processor to:
receive a plurality of input signals from the user interface, and
customize each of the first message, the second message, and the third message based on the plurality of input signals received from the user interface.

12. A method of operating an emergency system at a premises, the method comprising:

receiving, via a communication interface of a first system device, an alarm signal indicative of an event at the premises, transmitting automatically, via the communication interface of the first system device, a first message to a first group of communication devices in response to receiving the alarm signal, the first group of communication devices being associated with a first group of recipients, determining automatically whether the first message has not been canceled after predetermined period of time following the transmission of the first message has elapsed, and transmitting, via the communication interface of the first system device, a second message to a second group of communication devices different from the first group based on the first message not being canceled, the second group of communication devices being associated with a second group of recipients, and determining automatically whether to transmit, via the communication interface of the first system device, a third message to a third group of communication devices different from the first group and the second group after the predetermined period of time has elapsed, the third group of communication devices being associated with a third group of recipients, wherein each of the first message, the second message, and the third message is customized based on the group of recipients associated with each of the first group, the second group, and the third group of communication devices.

13. The method of claim 12, further comprising:

receiving a plurality of input signals from a user interface of at least one of the first system device and a second system device, and customizing each of the first message, the second message, and the third message based on the plurality of input signals received from the user interface.

14. A method of operating an emergency system at a premises, the method comprising:

receiving, via a communication interface of a first system device, an alarm signal indicative of an event at the premises, transmitting automatically, via the communication interface of the first system device, a first message to a first group of communication devices in response to receiving the alarm signal, the first group of communication devices being associated with a first group of recipients, determining automatically whether to transmit, via the communication interface of the first system device, a second message to a second group of communication devices different from the first group after a predetermined period of time following the transmission of the first message has elapsed, the second group of communication devices being associated with a second group of recipients, determining automatically whether to transmit, via the communication interface of the first system device, a third message to a third group of communication devices different from the first group and the second group after the predetermined period of time has elapsed, the third group of communication devices being associated with a third group of recipients, wherein each of the first message, the second message, and the third message is customized based on the group of recipients associated with each of the first group, the second group, and the third group of communication devices, transmitting, from a first communication device of the first group of communication devices, a fourth message to the first group of communication devices, receiving, via the communication interface of the first system device, the fourth message from the first communication device, and transmitting automatically, via the communication interface of the first system device, a fifth message to the second group and the third group of communication devices in response to receiving the fourth message.

15. The method of claim 14, further comprising receiving with a second communication device of the first group of communication devices, the fourth message from the first communication device.

16. The method of claim 14, further comprising transmitting automatically, via the communication interface, a control signal to a door control system at the premises to selectively operate at least one door at the premises after the predetermined period of time has elapsed.

17. The method of claim 14, further comprising transmitting automatically, via the communication interface, a control signal to a public address system at the premises to produce a customized audible message at the premises after the predetermined period of time has elapsed.

18. The method of claim 12, wherein the first group of recipients includes at least one individual from a group comprising security officers, law enforcement personnel, and administrators.

19. The method of claim 18, wherein the second group of recipients includes at least one individual from a group comprising students and faculty.

20. The method of claim 19, wherein the third group of recipients includes at least one individual from a group comprising parents, student emergency contacts, and media sources.

* * * * *